Oct. 8, 1940.  R. L. H. SMITH  2,217,388
HARDNESS TESTING MACHINE
Filed March 11, 1939  3 Sheets-Sheet 1
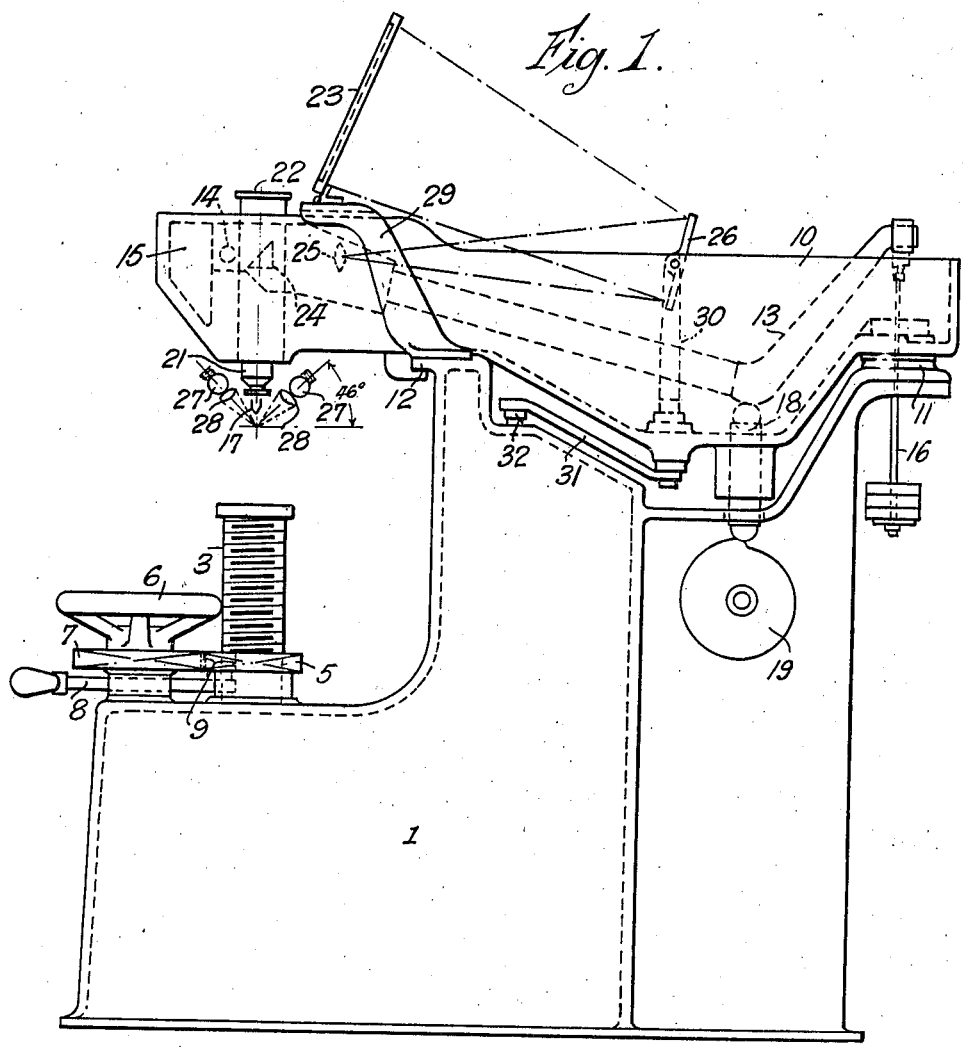
Inventor:
Robert Low Heron Smith,
By his attorneys,
Baldwin & Wight Oct. 8, 1940.    R. L. H. SMITH    2,217,388
HARDNESS TESTING MACHINE
Filed March 11, 1939    3 Sheets-Sheet 2

Inventor:
Robert Low Heron Smith;
By his attorneys,
Baldwin & Wight

Oct. 8, 1940.   R. L. H. SMITH   2,217,388
HARDNESS TESTING MACHINE
Filed March 11, 1939   3 Sheets-Sheet 3

Inventor:
Robert Low Heron Smith,
By his attorneys,
Baldwin & Wight

Patented Oct. 8, 1940

2,217,388

UNITED STATES PATENT OFFICE 2,217,388

HARDNESS TESTING MACHINE

Robert Low Heron Smith, Mottingham, London, England

Application March 11, 1939, Serial No. 261,381
In Great Britain March 14, 1938

3 Claims. (Cl. 265—12)

The invention relates to hardness testing machines of the kind in which a hard object termed an indentor is pressed under predetermined conditions into a surface of the test specimen, the dimensions of the impression constituting a measure of the hardness.

The principal conditions to be observed are the pressure of the indentor on the specimen and the time during which the pressure is applied. Testing machines have been constructed in which the indentor is raised from the specimen after the desired time interval by automatic means. The specimen is then moved into the field of a microscope, by means of which the dimensions of an impression are measured either by an eye piece micrometer or on a projection screen receiving an enlarged image. Alternatively the indenting mechanism and the microscope may be moved, while the specimen remains stationary.

The observer must of necessity wait while the indentor is making the impression, and the object of the present invention is to increase the output of both observer and machine by reducing the amount of enforced idleness during the waiting time.

According to the invention a hardness testing machine of the kind referred to is provided with means for accommodating two test specimens simultaneously but independently, one set of indenting mechanism, and two sets of observing mechanism such as a microscope, the arrangement being such that in one of two alternative positions the indenting mechanism is adapted to act on one specimen and observing mechanism on the other, and in the other position observing mechanism is adapted to act on the specimen first referred to and the indenting mechanism on the next specimen.

The observing mechanism may be a microscope as referred to above, or it may be a projection arrangement giving an enlarged image of the impression on a screen. In the latter case, if one set of indenting mechanism is incorporated in the machine it will not be necessary to duplicate the whole of the projection arrangement. At least the lens nearest the impression will be duplicated, and where the projection lens forms on the screen an image of an enlarged image produced by an object glass, both lenses are advantageously duplicated. A single screen is then preferably used for observing both specimens, a movable mirror providing for the positioning of one or other image on the screen in turn.

The indenting mechanism usually comprises a lever loaded with weights, which can be varied to give different pressures on the indentor to suit widely varying nature or condition of the materials to be tested. To obviate a disturbing swing of the suspended weights when changing over from one specimen to another, it is preferable to mount the moving parts on a swinging carriage or arm pivoted on the line of action of the weights. There is then no appreciable lateral movement of the weights, but only a small rotation about their centre of gravity.

The accompanying drawings, which are partly diagrammatic, illustrate a preferred embodiment of the invention, and therein Figure 1 is a side elevation of a hardness testing machine, Figure 1a being a modification of a detail, Figure 2 is a front elevation,

Figure 1A:
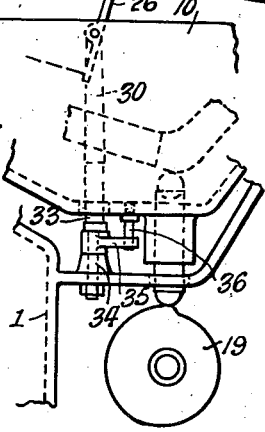
Figure 2:
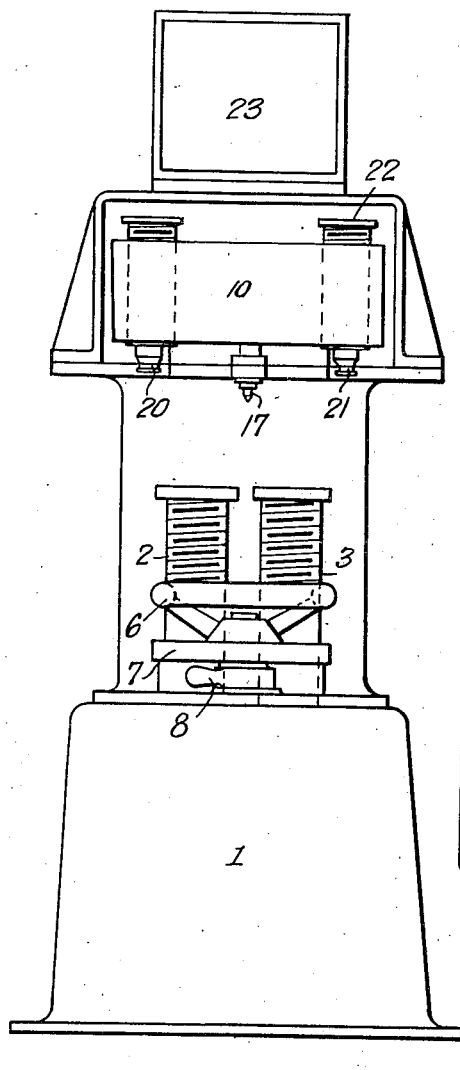
Figure 3:
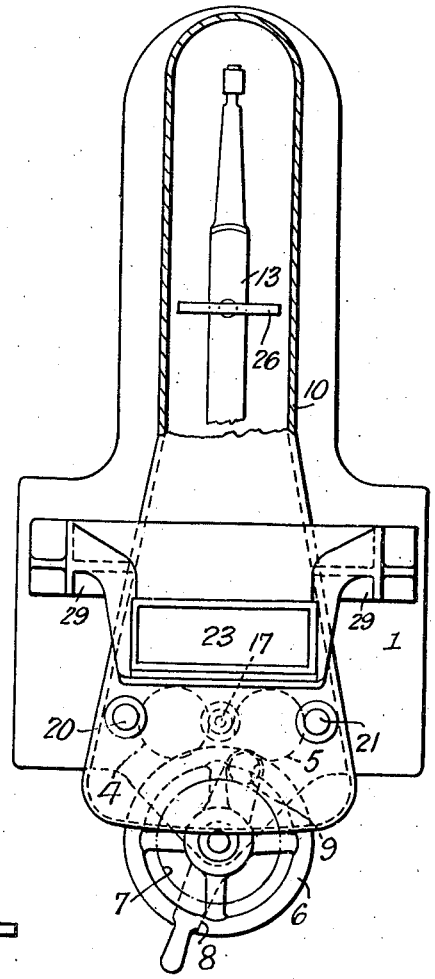
Figure 3 is a plan.

Referring to Figures 1, 2 and 3, the machine comprises a substantial base 1, in which two anvils 2 and 3 are mounted to support the two specimens. The anvils have screwed spindles to engage nuts 4 and 5 respectively rotatable in the base 1. Each anvil is provided with a groove in the axial direction to prevent it from rotating, and the nuts are freely rotatable but secured against vertical movement.

A hand wheel 6 is journalled in the base 1 and is attached to a gear wheel 7. The nuts 4 and 5 are provided with corresponding teeth on their periphery. A lever 8 is pivoted concentrically with the hand wheel 6 and has a handle at its forward end. At the rear end it carries an idler 9, which is in permanent driving connection with the gear wheel 7 and can be swung by the lever into driving connection with either nut 4 or 5 or into a neutral position. By this means the anvils with the work on them can be raised or lowered independently of each other to bring the specimens to the correct height for the testing operation. Adequate height adjustment is provided for the varying sizes of the specimens to be tested.

The mechanisms for indenting and observing are mounted on a swinging carriage in the form of an arm 10, shown in Figures 2 and 3 in a neutral or inoperative position. The arm 10 is journalled at 11 on a collar forming a part of the base 1. Near its forward end the arm 10 is supported and guided on a flange 12 of the base. Stops (not shown) limit the movement of the arm in both directions, so that in each extreme position it is correctly placed in relation to the anvils 2 and 3, as will be referred to later.

The arm 10 has indenting mechanism on its centre line, and this mechanism comprises a lever 13 pivoted at 14 with a balance weight 15 and a rod 16 to receive weights. The balance weight 15 is such that the lever 13 floats when there are no weights on the rod 16. The rod 16 passes through the collar 11 with ample clearance, so that the weights hang free.

Figure 1 is intended principally to show the microscope. The indentor itself is therefore indicated conventionally as a detached point 17. It is actuated from the lever 13 by the usual well known mechanism. Preferably the lever 13 has a ratio of 20:1, and the indentor is a diamond cut to the standard square pyramid shape, as will be referred to later.

The load lever 13 has an elbow bend, by the point of which it rests on a plunger 18 adapted to slide vertically in the base 1. The lower end of the plunger 18 is supported on a spiral cam 19, and in the position of Figure 1 the lever is supported at this point so that there is no load on the indentor.

If the cam 19 is rotated in a clockwise direction, the support of the lever 13 will be gradually withdrawn, and the weights will then cause the indentor 17 to make an impression on the specimen on one of the anvils. By means of timing mechanism of a known kind the cam 19 is caused to move in the opposite direction at the appropriate time into the position of Figure 1, so that the load is smoothly taken off the indentor after it has acted for the desired length of time.

The arm 10 carries two identical microscopes 20 and 21, of which only 21 will be described. Although the impression may be viewed direct by an eye piece at 22, the preferred arrangement is to project an enlarged image of the impression onto a stationary screen. The screen is shown at 23, and the light passes to it through the objective at the lower end of the microscope 21, a right-angled reflecting prism or mirror 24, a projection lens 25 and a mirror 26. Enclosing means to prevent the entry of stray light has been omitted so as not to complicate the drawings.

To illuminate the impression two lamps 27, 27, each with a condenser 28, are provided, and they are set diametrically opposite each other in plan, with centre lines at an elevation of 46° above the horizontal. The standard diamond indentor has its four faces at angles of 68° to the vertical axis. The light from the two lamps will thus be reflected from two opposite facets of the impression vertically into the axis of the microscope, and the image on the screen will be a square divided by the two diagonals into four triangles, of which two opposite ones will be bright and the other two dark. The form and brilliance of the image render it very easy to make measurements across the corners with a high degree of accuracy. Of course the usual form of vertical illumination could be fitted if it is desired to use a spherical indentor and could in fact be used with a pyramid indentor.

The microscope 20 is provided with duplicated parts corresponding to the eye piece 22, reflector 24, projecting lens 25, lamps 27, 27 and condensers 28, 28. On the other hand there is only one screen 23 and one mirror 26. The screen 23 is supported by arms 29 on the base 1 and is fixed in position.

The mirror 26 is supported in a U-bracket 30 pivoted in the arm 10. A lever 31 is attached to the lower end of the supporting spindle to engage a stud 32 on the base 1. The purpose of this arrangement is to swing the mirror 26 when the arm 10 is moved from one position to the other, so that the image of the impression is always correctly central on the screen 23.

The mirror 26 can be reduced in width if the U-bracket 30 is pivoted in the base 1. The relevant parts are shown in Figure 1a, which represents the modification necessary in this case to Figure 1. The stem 33 of the bracket 30 is pivoted at 34 on the base 1 and passes through the lower side of the arm 10 with sufficient clearance to permit the arm to move to its alternative positions without obstruction. A lever 35 attached to the stem 33 has a forked end, which engages a pin 36 screwed into the lower side of the arm 10. It will be noted that the lever 35 in Figure 1a extends in the opposite direction to the corresponding lever 31 in Figure 1.

Figure 4:
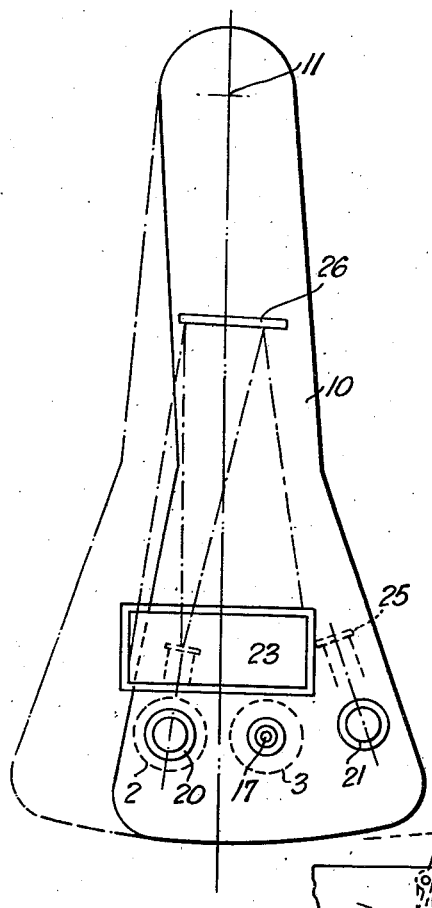
Figure 4 is a diagrammatic plan showing one working position.
Figure 5:
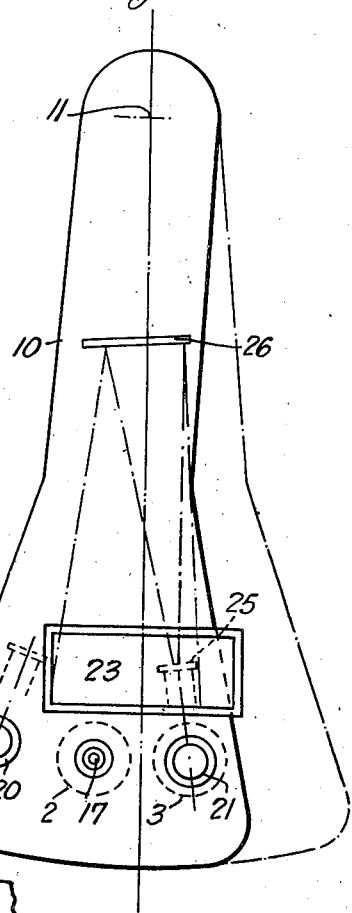
Figure 5 is a corresponding diagrammatic plan showing the other working position.

The operation of the machine will now be described with reference to Figures 4 and 5. With the machine in the position of Figure 4 a specimen is placed on the anvil 2 under the microscope 20 and with the aid of the latter is adjusted to the correct height by rotating the hand wheel 6. The arm 10 is then moved to the position of Figure 5 to bring the indentor 17 over the specimen, and the indentor is set into operation by the cam 19 with automatic timing. A specimen on the other anvil 3, which has previously been impressed, is then under the microscope 21. The impression is measured on the screen 23, the specimen removed and a fresh one inserted and adjusted as before. By this time the impression will have been completed on the specimen on the anvil 2, and the arm 10 is swung to the position of Figure 4 to bring the microscope 20 over it and the indentor 17 on to the specimen on the anvil 3. The work thus proceeds in alternation without any necessity for the operator to wait while the impression is being made.

What I claim is:

1. A hardness testing machine comprising in combination means for accommodating two test specimens simultaneously but independently, an arm movable on a vertical pivot selectively into either of two alternative positions, a set of indenting mechanism mounted on the arm in a location to act on one of the two specimens in each of the alternative positions, said indenting mechanism including a load lever with weights suspended substantially at the pivot axis of the arm, and two sets of observing mechanism located on the arm on either side of the indenting mechanism so that in each position of the arm one set of observing mechanism is in operative relationship to the specimen not adapted to be acted on by the indenting mechanism in that position.

2. A hardness testing machine comprising in combination means for accommodating two test specimens simultaneously but independently, an arm movable on a vertical pivot selectively into either of two alternative positions, a set of indenting mechanism mounted on the arm in a location to act on one of the two specimens in each of the alternative positions, said indenting mechanism including a load lever with weights suspended substantially at the pivot axis of the arm, two optical devices each comprising a microscope objective, a mirror to reflect from a vertical to an approximately horizontal direction and a projection lens, the optical devices being located on the arm one either side of the indenting mechanism so that in each position of the arm the microscope objective of one optical device is in operative relationship to the specimen not adapted to be acted on by the indenting mechanism in that position, a projection screen to receive the images formed by the optical devices, and a pivoted mirror movable by the arm to locate correctly on the projection screen the image formed by the optical device in operation in the respective position of the arm.

3. A hardness testing machine according to claim 2 in which the last-named mirror is pivoted on the stationary part of the machine and is provided with a lever adapted to engage the arm.

ROBERT LOW HERON SMITH.